United States Patent [19]

Weinberger

[11] 3,786,787
[45] Jan. 22, 1974

[54] DEVICE FOR DISPOSING OF DOG DROPPINGS

[76] Inventor: Morton Weinberger, 1023 S. Carley Ct., North Bellmore, N.Y. 11710

[22] Filed: Jan. 2, 1973

[21] Appl. No.: 320,672

[52] U.S. Cl. .................................. 119/95, 128/283
[51] Int. Cl. ............................................ A01k 23/00
[58] Field of Search ............... 119/95; 128/283, 289

[56] References Cited
UNITED STATES PATENTS

| | | | |
|---|---|---|---|
| 1,175,773 | 3/1916 | Khoubesserian | 119/95 |
| 3,656,459 | 3/1970 | Missud | 119/95 |
| 2,173,356 | 9/1939 | Cross | 119/95 |
| 2,247,431 | 7/1941 | Behrens | 119/95 |

Primary Examiner—Louis G. Mancene
Assistant Examiner—J. N. Eskovitz
Attorney, Agent, or Firm—Orville N. Greene et al.

[57] ABSTRACT

A harness and bag device for dogs and similar pets is described of which at least the bag portion thereof is disposable. The harness includes cooperating back and belly strip means which are connectable to encircle the dog at the girth, and a pair of bag-carrying strap means extending from the back strap to the belly strap and adapted to pass inside the hind legs of the dog. Bag means is provided integrally with, or attachable to, the pair of bag-carrying strap means and connection is provided between the straps to locate the back strap with respect to the tail and thereby to properly position the bag for catching the dog droppings. The bag is formed on or attached to the bag-carrying straps in such a way as not to interfere with the dog's movement, or to tightly cover any part that the dog may try to lick, scratch or bite.

4 Claims, 6 Drawing Figures

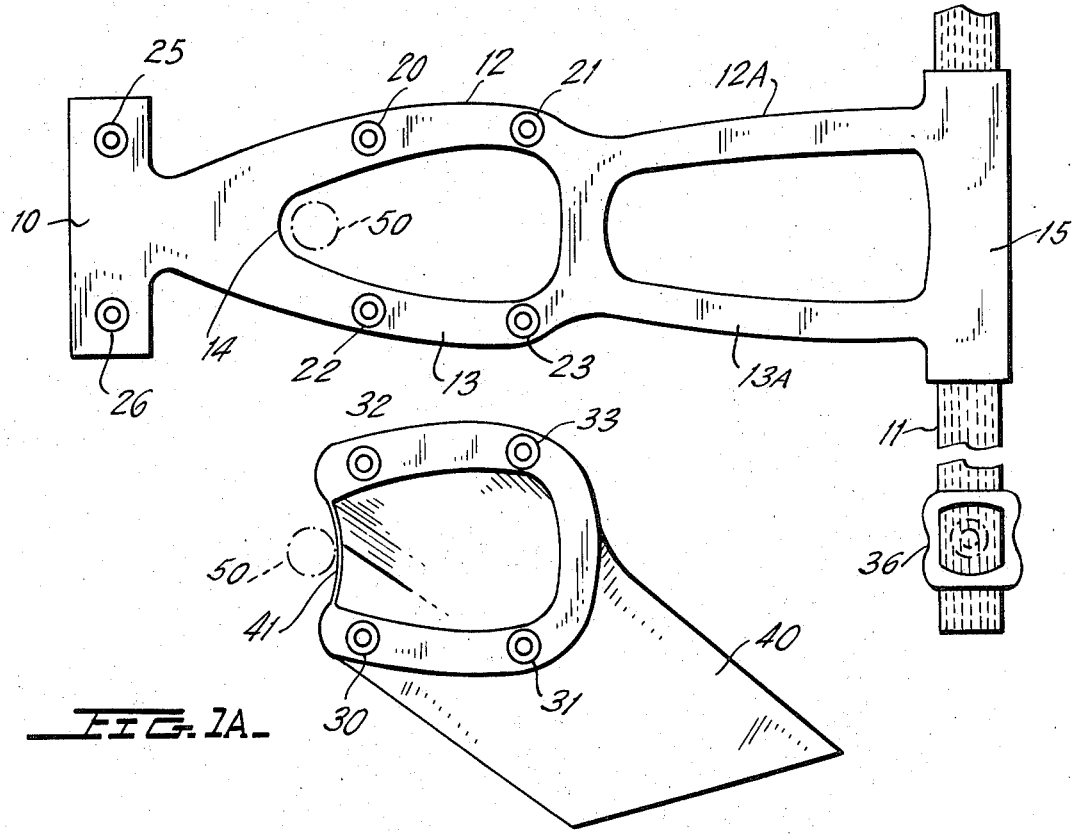
FIG. 1
FIG. 1A
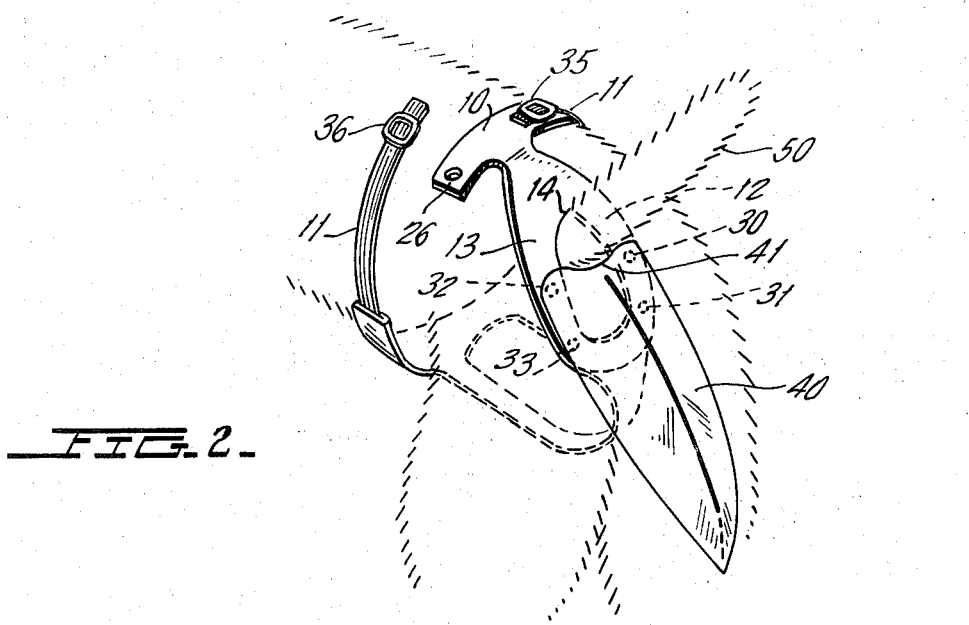
FIG. 2

DEVICE FOR DISPOSING OF DOG DROPPINGS

This invention relates to a device for receiving and disposing of pet animal excrement, especially dog excrement, of the type which includes a bag for catching the excrement and a harness for holding and positioning the bag for receiving the excrement.

Several bag and harness devices have been devised for the same purpose. Notice has been taken of U.S. Pat. Nos. 2,173,356, 3,090,356, and 3,656,459, for example, but none of these appear to have become acceptable to the dogs who must wear them.

Among the objects of the invention is to provide a bag and harness device for dogs and similar pets which is not a burden to the wearer and, when worn, does not tightly cover or adhere to any portion of the dog's body which the dog may want to scratch, lick or bite.

Among other objects of the invention is to provide a bag and harness device for the purpose described, in which the bag portion and/or the entire harness and bag is disposable.

Among still further objects of the invention is to provide a bag and harness device for the purpose described which is disposable and in which all the essential portions are made from one piece of plastic film and being able to be manufactured very cheaply, thus gaining a wide consumer acceptance.

The objects of the invention are attained by providing a harness comprising a pair of girth straps, namely a back strap and a belly strap, which are connectable to each other at adjacent ends to encircle the body of the dog, said back and belly straps being connected by a pair of bag holding straps extending from the back strap, almost perpendicularly but slightly diverging, to the belly strap. Thus, bag-holding straps at the connection to the back strap may be fairly closely spaced, but at the connection to the belly strap are substantially spaced to make sure that the straps, in passing between the legs of the dog, tend to surround a portion of the inner haunches of the thigh. The bag holding straps, if not connected at the back strap, have a first, cross, connecting strap attached thereto, the connection at the back strap or by a connecting strap being adapted to rest above the tail to position the bag-holding portion of said straps. Each strap has it's bag-holding portion located just below the tail resting portion and a connecting cross-strap may be provided below or adjacent to the lower part of the bag holding portion. A plastic bag is removably attached to the bag holding portion. In cases where the entire harness and bag is disposable, the bag can be integrally formed on the bag holding portion of said bag holding straps and the bag itself serves the purpose of the cross-strap. Various additional connection portions may be formed between the bag holding straps, and where the girth straps and bag holding straps are made from a single piece of material, the structure of the straps may be partially obscured by internally cutting the piece in such a way as to avoid sharp corners, but nevertheless, the essential girth straps and bag-holding straps will be present and each is identifiable, as a general rule, by at least one continuous, external, straight line, curvilinear, or partially curvilinear edge.

In the drawings:

FIG. 1 is a plan view of the harness, with bag-attaching means, made according to the invention.

FIG. 1A is a perspective view of a bag for removably attaching to the harness of FIG. 1.

FIG. 2 is a view illustrating how the harness and bag of FIGS. 1 and 1A fit onto a dog.

Figure 3:
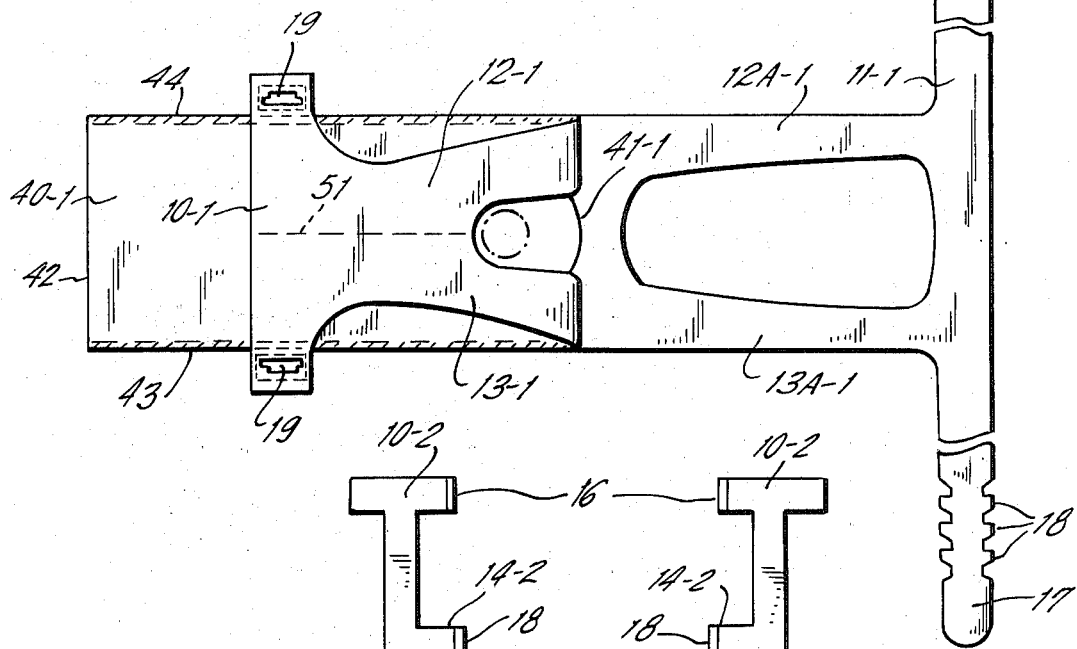
FIG. 3 is a plan view of a modified form of harness and bag.

The harness of FIG. 1 comprises a back strap 10, a belly strap 11, which together form the girth straps. Extending between back strap and belly strap are the bag-supporting straps 12, 12A and 13,13A. Each of said bag-supporting straps include a curvilinear portion 12 or 13 and a straight portion 12A or 13A. Said strap portions 12 and 13 are connected at the back strap 10 and for a distance down to the tail resting portion 14, the tail being shown on dotted lines at 50. Parts 12A and 13A of the bag-holding straps diverge somewhat before connecting to belly strap 11. In FIG. 1, the belly strap 11 is shown as being formed separately from the bag supporting straps, said straps having an end-spacing and connecting portion 15 which is attached to belly strap 11 in any suitable way as by sewing or heat sealing. Obviously, the entire combination of straps, as shown in FIG. 1, can be formed from one flat piece of material by a simple stamping operation.

The harness of FIG. 1 is provided with four male or female parts of a snap fastening element 20–23. Snap fasteners of this type are well-known in commerce and may be made of metal or plastic. Very suitable snap fasteners for this invention are the plastic fasteners disclosied in U.S. Pat. No. 2,548,004, where the male or female portion of the fastener is itself made of male and female parts so that it, itself, can be snapped onto a plastic strip or a plastic bag, the strip or bag being preferably provided with a hole to admit the male part of each fastener element.

The bag 40 of FIG. 1A is an ordinary type of plastic bag which at its mouth, however, is fitted with male or female counterparts 30–33 to fastener elements 20–23 of FIG. 1. The distance between fastener elements 30 and 32 are so spaced that the upper edge 41 of the bag, when applied to the harness on a dog, loosely surrounds the lower part of the tail without however restricting the movement of the tail. The operable part of the fasteners 30–33 are on the inside of the bag 20 as to outwardly flare the bag 40 when the fastener parts 30–33 are attached to fastener elements 20–23 so as to tend to stiffen the edge 41 in its upward position. Each of the sides of the mouth of the bag is firmly attached to at least two spaced regions along a substantial portion of said sides so that, although the bag is not tight against the dog's body, it is fully open and adapted to catch any droppings from the dog.

The harness is fitted onto the dog by inserting part 14 over the tail of the dog, passing the belly straps between the dogs hind legs and bringing belly strap 11 around the girth and fastening to the back strap 10. Suitable fastener elements are provided to fasten the ends of the belly strap to the back strap. In FIGS. 1 and 2, these fasteners are again shown as male and female two-part fasteners, two male fastener elements 25 and 26 being shown on back strap 10 and two movable buckles 35 and 36 containing the complementary female elements being shown on strap 11.

FIG. 3 shows a modified form of device wherein the entire bag and harness is made of one piece of material and in which the harness and bag are disposable. The harness and bag shown in FIG. 3 has been completed, after cutting from a single sheet, by folding on edge 42 and heat sealing or otherwise uniting the edges 43 and 44 to form the bag. Similar numbers are used to designate similar parts throughout the specification. The ends of strap 11-1 are provided with a tongue 17 and a series of serrated projections 18 sloping away from the tongue so that the tongue and projections can be inserted into slots 19 of back strip 10-1, but are difficult to remove therefrom. Any other type of catch means may be substituted.

Figure 4:
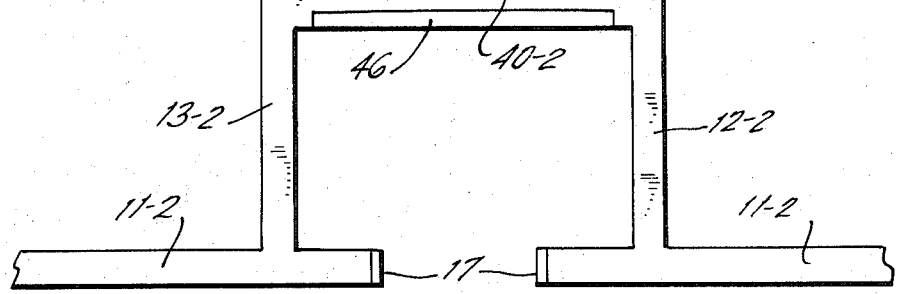
FIG. 4 is a plan view of a blank for forming another modified form of harness and bag.
Figure 4A:
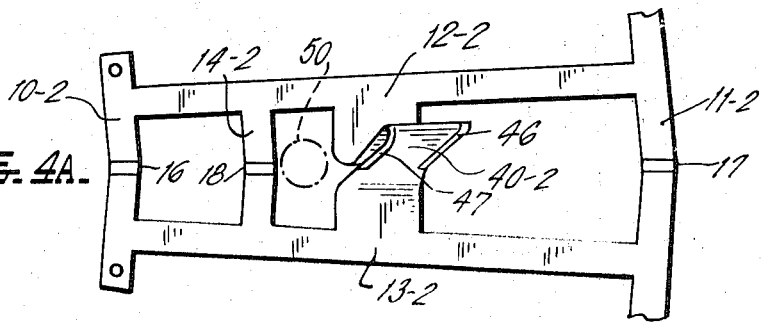
FIG. 4A is a view illustrating how the bag is formed from the blank of FIG. 4.

FIGS. 4 and 4A show another modified form of harness and bag made from one piece of sheet material. In this structure, the back strap 10-12 is cut in two parts with portions 16 thereof adapted to be overlapped and heat sealed or otherwise united. Similarly, the part 14-2, to be supported on the tail, is made in two separated parts, with parts 18 thereof adapted to be overlapped and united, and part 11-2 with parts 17 adapted to be overlapped and united. The bag portion 40-2 is united along edges 46 and 47 to provide the bag 40-2.

If desired, the back portion 10-1 of FIG. 3 may be provided with a weakened line 51 so that once the device has been used, it can be readily removed by tearing along line 51. Similar weakened lines may be provided on the device of FIGS. 4 and 4A.

The device illustrated in FIGS. 1 and 2 have been used on a dog for over 3 months. The dog has never become nervous or upset as a result of his inability to lick or scratch any part covered by the harness. In fact, this dog has become aware of what the apparatus is for in the same way that a paper-trained dog becomes aware of paper which is spread on the bathroom floor and the apparatus has, therefore, become very useful when it has been impossible for some reason to walk the dog. The harness can be made in several sizes, and since it does not have to be tightly fitted to the dog, only about three sizes are required to cover the various sizes of dogs.

I claim:

1. Harness and bag device for catching droppings from dogs and similar pets comprising
    two grith straps comprising a back strap and a belly strap and means for securing the two ends of the belly strap to the corresponding ends of the back strap to attach the harness to the dog,
    a pair of bag-carrying straps extending from closely spaced intermediate points on the back strap to separated points on the belly strap,
    positioning means extending between said bag carrying straps at a region fairly close to the back strap for resting on the tail of the dog,
    a bag having a mouth of substantially the same cross-sectional size as the body thereof, said bag being connected to a first of said bag-carrying straps below said positioning means and along a substantial portion of one side of the mouth of the bag, said bag being connected to the second bag-carrying strap below said positioning means and along a similar portion of the opposite side of the mouth of the bag and said connections between the mouth of the bag and said straps being such that the upper edge of the mouth of said bag fits loosely under the tail of the dog.

2. The harness and bag device as claimed in claim 1 wherein the mouth of said bag is attached to said bag-carrying straps by separable fasteners, each of said bag-carrying straps containing at least two spaced parts of separable fasteners and the mouth of said bag-carrying complementary parts of said separable fasteners with the operable portion thereof on the inside of the bag.

3. Harness and bag device for catching droppings from dogs and similar pets comprising
    two girth straps comprising a back strap and a belly strap and means for securing the two ends of the belly strap to the corresponding ends of the back strap to attach the harness to the dog,
    a pair of bag carrying straps extending from closely spaced intermediate points on the back strap to separated points on the belly strap,
    positioning means extending between said bag carrying straps at a region fairly close to the back strap for resting on the tail of the dog,
    said bag carrying straps having a bag formed integrally thereon in the region between said positioning means and the belly strap, said bag having its opening transversely of the strap means, whereby said harness and bag combination may be made of a single piece of material.

4. The harness and bag device as claimed in claim 3 wherein the bag comprises two similar, quadangular panels closed on three sides, one of the closed sides being formed by folding a blank approximately twice the size of the panel and the other two closed sides being formed by sealing.

* * * * *